US008012355B2

(12) United States Patent
Johnson

(10) Patent No.: US 8,012,355 B2
(45) Date of Patent: Sep. 6, 2011

(54) MOLECULAR SEPARATOR

(75) Inventor: Raymond Ford Johnson, White Oak, TX (US)

(73) Assignee: PSS Acquisitionco LLC, Stamford, CT (US)

( * ) Notice: Subject to any disclaimer, the term of this patent is extended or adjusted under 35 U.S.C. 154(b) by 603 days.

(21) Appl. No.: 12/099,690

(22) Filed: Apr. 8, 2008

(65) Prior Publication Data

US 2008/0272065 A1   Nov. 6, 2008

Related U.S. Application Data

(63) Continuation-in-part of application No. 11/042,235, filed on Jan. 25, 2005, now Pat. No. 7,459,091.

(60) Provisional application No. 60/540,492, filed on Jan. 30, 2004.

(51) Int. Cl.
*B01D 65/02* (2006.01)

(52) U.S. Cl. ........ 210/636; 204/542; 210/641; 210/650; 210/652; 210/748.01; 210/748.02; 210/748.1; 210/770; 210/771; 210/774; 210/785; 210/791; 210/798; 210/806

(58) Field of Classification Search .................. 210/638, 210/641, 650, 651, 695, 748.01, 748.02, 210/748.03, 748.05, 764, 768–774, 785, 210/791, 797, 798, 804, 805, 806, 636, 652, 210/748.1; 219/69.14; 451/36, 60, 446; 438/691; 204/518, 542
See application file for complete search history.

(56) References Cited

U.S. PATENT DOCUMENTS

| | | | |
|---|---|---|---|
| 3,206,397 A * | 9/1965 | Harvey | ................... 210/652 |
| 4,029,114 A | 6/1977 | Wiltrout | |
| 4,055,500 A | 10/1977 | Parker | |
| 4,158,629 A | 6/1979 | Sawyer | |
| 4,222,874 A | 9/1980 | Connelly | |
| 4,352,739 A | 10/1982 | Oliver, Jr. et al. | |
| 4,384,943 A | 5/1983 | Stoner et al. | |
| 4,642,188 A | 2/1987 | DeVisser et al. | |
| 4,927,547 A | 5/1990 | Backman | |
| 4,957,625 A | 9/1990 | Katoh et al. | |
| 5,059,331 A * | 10/1991 | Goyal | ................... 210/785 |
| 5,298,161 A * | 3/1994 | Sieg | ................... 210/321.78 |
| 5,346,629 A | 9/1994 | Wuller | |
| 5,374,351 A | 12/1994 | Bolton et al. | |
| 5,401,397 A | 3/1995 | Moorehead | |

(Continued)

FOREIGN PATENT DOCUMENTS

DE         3026769 A1       2/1981

(Continued)

*Primary Examiner* — Joseph W Drodge
(74) *Attorney, Agent, or Firm* — Bell Nunnally and Martin LLP; Craig J. Cox

(57) ABSTRACT

The present invention discloses a method and apparatus for separating particles and dissolved matter from an untreated fluid stream. Specifically, the present invention includes a first pressure source which transports untreated fluid or contaminated aqueous fluid into a separator annulus with a filter element disposed therein. The untreated fluid is placed under appropriate pressure sufficient to produce turbulent flow, increased particle kinetics and/or cavitation allowing the desired fluid to penetrate and pass into and through the filter media. The treated fluid is then transported to a collection tank. The contaminant matter retained by the filter media may be removed by the nearly instantaneous reverse pressurization of the separator annulus by a second pressure source thereby removing the contaminant particles away from contact with the filter media, and which may then be transported to a waste collection tank or a separator for further treatment.

13 Claims, 10 Drawing Sheets

U.S. PATENT DOCUMENTS

| | | | | |
|---|---|---|---|---|
| 5,434,381 | A * | 7/1995 | Mitcheson | 219/69.14 |
| 5,846,420 | A | 12/1998 | Bolton et al. | |
| 5,906,751 | A | 5/1999 | Parker | |
| 5,919,376 | A * | 7/1999 | Carman | 210/785 |
| 6,085,915 | A | 7/2000 | Schwandt et al. | |
| 6,110,390 | A | 8/2000 | Potter et al. | |
| 6,155,430 | A | 12/2000 | Goodman | |
| 6,203,696 | B1 | 3/2001 | Pearson | |
| 6,251,294 | B1 * | 6/2001 | Davis et al. | 210/785 |
| 6,362,103 | B1 * | 3/2002 | Watts | 438/691 |
| 6,395,186 | B1 * | 5/2002 | De Kock et al. | 210/748.05 |
| 6,447,678 | B2 | 9/2002 | Chau | |
| 6,562,246 | B2 | 5/2003 | McGowan | |
| 6,576,146 | B2 | 6/2003 | Fry et al. | |
| 6,607,661 | B2 | 8/2003 | Koivula | |
| 6,669,843 | B2 | 12/2003 | Arnaud | |
| 6,712,981 | B2 | 3/2004 | Benenson, Jr. et al. | |
| 6,866,567 | B2 * | 3/2005 | Gotkis | 451/60 |
| 7,008,540 | B1 * | 3/2006 | Weavers et al. | 210/636 |
| 7,459,091 | B2 * | 12/2008 | Johnson et al. | 210/768 |
| 2003/0146171 | A1 | 8/2003 | Herrmann | |
| 2003/0209500 | A1 * | 11/2003 | Kock et al. | 210/748 |
| 2004/0016699 | A1 * | 1/2004 | Bayevsky | 210/636 |
| 2006/0191834 | A1 | 8/2006 | Fuchs et al. | |
| 2007/0110824 | A1 | 5/2007 | Nageswaran | |

FOREIGN PATENT DOCUMENTS

| | | |
|---|---|---|
| DE | 4101229 A | 7/1992 |
| FR | 2716385 A | 8/1995 |
| GB | 2356432 A | 5/2001 |
| JP | 62149304 A | 7/1987 |
| JP | 08019731 | 1/1996 |
| JP | 2002346347 | 12/2002 |
| WO | 9916715 | 4/1999 |

\* cited by examiner

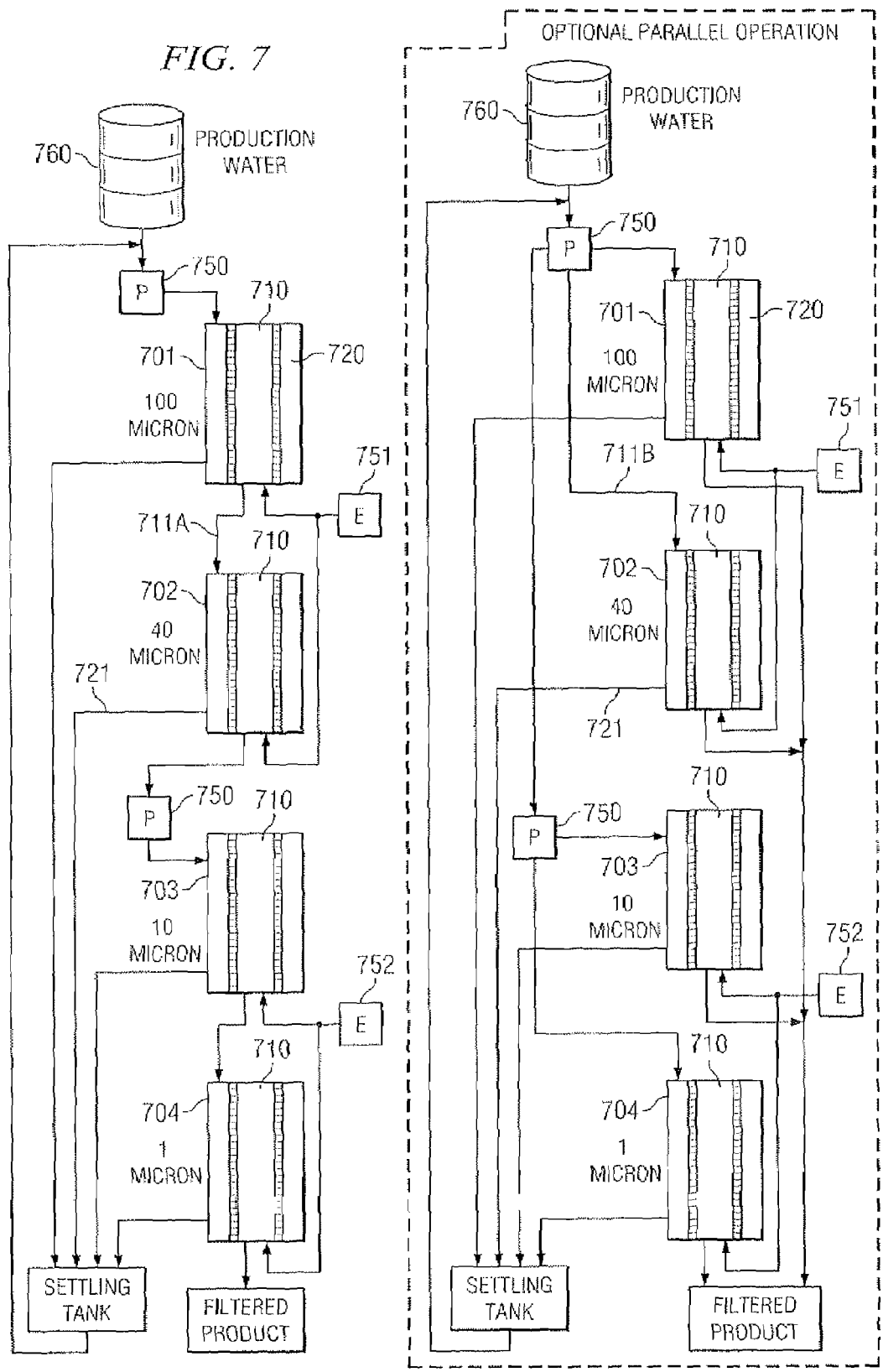

MOLECULAR SEPARATOR

CROSS-REFERENCES TO RELATED APPLICATIONS

This application is a continuation-in-part and claims the benefit of and priority to U.S. patent application Ser. No. 11/042,235, now U.S. Pat. No. 7,459,091 which was filed on Jan. 25, 2005, which claims the benefit of and priority to U.S. Pat. No. 7,291,267, filed on Apr. 8, 2004, which claims the benefit of and priority to U.S. Provisional Application No. 60/540,492, filed Jan. 30, 2004, the disclosures of which are incorporated herein by reference.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

1. Technical Field

The present invention relates to an improved apparatus and system for improving the quality of fluids untreated from petroleum and gas well drilling and recovery operations, mining operations, and during other industrial activities, and specifically to a method that does not simply involve the use of traditional filtration or separation methods. The present system separates contaminants from a variety of fluids utilizing a pressure separation apparatus which can also create and facilitate hydrodynamic cavitation conditions within the fluid. This results in the improved separation and removal of particulates and dissolved constituents from the fluid.

2. Description of Related Art

The safe and effective removal of contaminants from fluids is a consistent problem faced by many industries. The impurities accumulated by fluids during the hydrologic cycle, industrial processes and manufacturing activities may appear in both suspended and dissolved forms. Suspended solids may be generally be classified as particles larger than molecular size (i e. particle sizes greater than $10^{-3}$ mm), which are supported by buoyant and viscous forces existing within the fluid. Dissolved materials (i.e. particle sizes less than $10^{-3}$ mm) consist of molecules and ions, which are held by the molecular structure of fluid.

The presence of suspended and/or dissolved solids in waste fluid and other fluids is undesirable for several reasons. The presence of visible suspended solids may be aesthetically displeasing. Likewise, the presence of suspended and/or dissolved solids allows for the adsorption of other chemicals or biological matter into the fluid. Due to the standards promulgated by government agencies, excessive contaminants must be removed from potable fluid, waste fluid and other types of contaminated fluid streams before the effluent may be discharged to the environment or recycled for reuse. If established discharge-contamination levels are exceeded, governmental authorities and agencies may impose surcharges and penalties on the entity responsible for the discharge of fluids which do not meet or exceed the appropriate standard of quality.

For example, both terrestrial and offshore oil and gas fields produce large quantities of contaminated fluid that can have significant environmental effects if they are not handled, remediated and discharged properly. In a typical petroleum formation, formation fluid lies adjacent the formation layer containing the desired hydrocarbons (e.g. oil and natural gas). As a result, when these hydrocarbons are removed from the formation via the wellbore, formation fluid is brought to the surface along with the hydrocarbons. Drilling fluids are utilized to assist in oil and gas well drilling operations. If required and in order to achieve maximum recovery, recovery fluids will be injected into the formation to provide additional motive force to recover the hydrocarbons from the formation. As a result, increasing volumes of both formation fluid and injected fluid are produced and remain untreated in the recovery of oil and gas from the formation. The treatment of untreated fluid is a major component of the cost of producing oil and gas.

Untreated fluid characteristics and physical properties vary considerably depending upon the geographic location of the field, the geological formation with which the untreated fluid has been in contact for thousands for years, and the type of hydrocarbon product being recovered. The contaminants of untreated ("TDS"). Other contaminants may include slurries having dispersed oil droplets, dissolved organic compounds including dissolved oil, drilling fluids, polymers, well treatment and workover chemicals, and other organic and inorganic compounds that can lead to toxicity. Some of these are naturally occurring in the untreated fluid while others are related to chemicals that have been added for drilling and well-control purposes. Further, contaminants can also include dissolved gases including hydrogen sulfide and carbon dioxide, bacteria and other living organisms, and dispersed solid particles. Untreated fluids also typically exhibit low concentrations of dissolved oxygen and non-volatile dissolved organic materials. Because of the contaminants in untreated fluid, it requires no large amount of thought to surmise that the direct release or reinjection of untreated fluid into the ocean, upon land, or into the subsurface formation would have damaging effects on the environment and pose health risks to animals and humans in both the short and long term.

One prior art solution for treating untreated fluid involves pumping the fluid through disposable filters to filter and remove the suspended solids. There are several problems with this prior art solution. First, once the disposable filters have been used they are typically considered hazardous waste and they must be sent to special disposal facilities for disposal after use further depleting the increasingly diminishing landfill space available. Second, the disposable filters are themselves relatively costly and therefore do not provide an economical treatment solution. Third, the constant changing of used disposable filters with clean or new disposable filters is labor intensive. Fourth, the disposable filters have a relatively short lifespan as they (1) are constructed of paper-based material which is easily degraded by contaminants, (2) are unable to continually support the sheer mass of the contaminants that are loaded onto the filters during filtration operations, and (3) cannot withstand typical backwash cleaning pressures. Consequently, a need exists for a way to minimize or eliminate the need for disposable filters in the removal of suspended solids from waste streams such as untreated fluid.

Another problem encountered in removing contaminants from fluids is the expense and difficulty in designing a system that can remove contaminants that vary widely in chemical and physical make-up. As alluded to above, the chemical make-up of contaminants ranges widely from dissolved oil and brine to bacteria in untreated fluids. Similarly the physical make-up of the contaminants varies in particle size from the ionic range (brine) to the micro and macro particle range (oil droplets, sand particles). Such a wide range of contaminants presents several challenges in treating untreated fluids. For example, slurries and biological contaminants can plug filtration equipment, and separation of metals from contaminated fluid typically requires expensive chemical precipitation processes. These are just a sampling of the difficulties encountered in the treatment of industrial waste fluid which illustrate the complexity and expense of treatment facilities that must be constructed to treat such waste fluid in lieu of disposable filters. Because such treatment facilities are complex, they are typically not mobile, therefore requiring industrial waste fluid be stored on-site and then shipped to a treatment facility. Consequently, a need exists for an improved method and apparatus for treating contaminated fluid. In one aspect, the apparatus and method should be mobile and able to be economically installed near the location where the untreated contaminated fluid originates. In another aspect, the apparatus and method should provide sufficient treatment to meet regulatory standards required to permit discharge of fluid directly into the environment and/or for reuse in industrial settings. Further, the method and apparatus should be able to provide for the treated fluid needs of the facility where the apparatus is located. As such, a need exists in the art for a portable, highly efficient filtration apparatus and method which can separate suspended and dissolved solids and other contaminants in a variety of environments. Further, a need exists for an improved apparatus and method of removing particles from fluids in either a liquid or gaseous state. Further, a need exists for an apparatus and method which can consistently remove particles of a desired size so as to efficiently and consistently reduce the chance of the imposition of a surcharge for violating quality control standards and the release of untreated effluents.

SUMMARY OF THE INVENTION

The present invention discloses a method and apparatus for separating particles, dissolved matter and chemical sub-fractions from a fluid stream. In one embodiment, the present invention also discloses a novel separator design which creates or enhances particle kinetics and cavitation physics to increase filtration efficiency and provides for the separation of chemical sub-fractions from fluid streams below one micron in size. In one aspect, the untreated fluid is placed under pressure sufficient to enhance standard filtration, create or enhance particle kinetic reactions, and/or to create or enhance hydrodynamic cavitation during the separation process wherein suspended and dissolved contaminants are separated from the fluid stream within the separator by one or more of said processes during the separation phase. The treated fluid may then be transported to a product collection tank, discharged, or sent to additional treatment or polish mechanisms. The particulate matter retained by the reusable filter media is removed by the instantaneous reverse pressurization of the separator thereby forcing treated waste away from the reusable filter media and into a reject tank. The waste from the reject tank can then further be treated, optionally, by further dewatering and minimization processes. Any resulting sludge can be further processed as necessary and the dried waste can then be transported to a waste collection center for appropriate disposal or landfilling. The treated effluent may be safely used in a variety of ways including, but not limited to, being discharged to the environment for beneficial reuse (e.g. potable fluid use or agricultural use), utilized for secondary and tertiary oil/gas recovery operations (e.g. frac fluid and steam flooding) or injected into disposal wells.

Other aspects, embodiments and features of the invention will become apparent from the following detailed description of the invention when considered in conjunction with the accompanying drawings. The accompanying figures are schematic and are not intended to be drawn to scale. In the figures, each identical or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is directed towards an improved fluid treatment system for removing contaminants from a variety of fluids, including but not limited to, waters, synthetic fluids, oil and petroleum based fluids, gases and other fluids occurring naturally and which are also manmade. In one embodiment, the use of hydrodynamic cavitation forces and physics in conjunction with traditional separation media to treat contaminated fluid is both novel and a significant improvement over existing filtration systems. "Untreated fluid" or "influent fluid" is used throughout the detailed description and refers to any fluid containing one or more contaminants. As used herein "untreated fluid" is used interchangeably with "influent fluid." As used herein, "contaminant" refers to any physical, chemical, biological, or radiological substance or matter which is to be entirely or substantially removed from the fluid in which the contaminant is suspended, dissolved or otherwise entrained.

Figure 1:
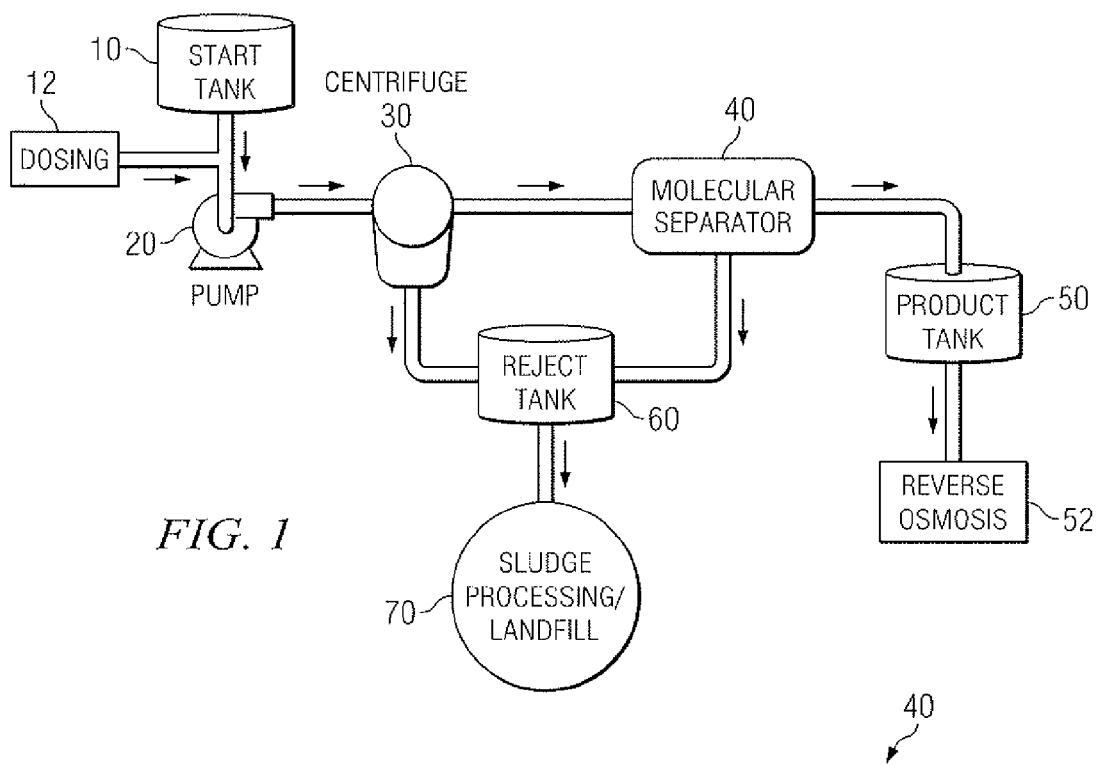
FIG. 1 illustrates a process flow diagram for a fluid treatment system in accordance with one embodiment of the present invention.

FIG. 1 illustrates a simplified process flow diagram for a fluid treatment system in accordance with one embodiment of the present invention. As shown in FIG. 1, untreated fluid is stored in a tank 10. Depending on the solids content of the untreated fluid, the untreated fluid can be routed via a pump 20 or other suitable means to a centrifuge 30 or dissolved air flotation system (DAF) to remove a substantial portion of suspended particles, such as sand, dirt, gravel, and other similar material. These constituents can be routed to a reject tank 60 where they can optionally be dewatered, pressed or stored for further processing or disposal 70. In one embodiment, the untreated fluid is routed directly to the molecular separator 40 without being routed to a centrifuge or other similar device.

In one embodiment, additives 12 can be added to the untreated fluid 10 near the pump inlet as shown in FIG. 1 and/or directly to the start tank 10. In one embodiment, the additives 10 can be added to help control or remove biological organisms or activity in the untreated fluid stream that can promote fouling of the flux cartridge as discussed in more detail below. Additives include, but are not limited to, sodium hypochlorite, chlorine ($Cl_2$), chlorine dioxide ($ClO_2$), bromine ($Br_2$), iodine (I), ozone ($O_3$), bleach, ammonia, metal ions (e.g. $Ag^+$ and $Cu^{2+}$), phenols, alcohols and other chemical disinfectant additives as known in the art. The untreated fluid from the waste tank can be treated in the molecular separator apparatus 40 to remove contaminants from the untreated fluid with the use of reusable filter media. The molecular separator apparatus 40 also provides the ability to concentrate contaminants and routes the contaminants to the reject tank 60 and routes treated fluid or product to a product storage tank 50. In one embodiment, the treated fluid from the molecular separator apparatus 40 can be further polished by routing the treated fluid through a disposable nano-filter (not shown) and/or by routing the treated fluid through a reverse osmosis system 52. The operation of one embodiment of the molecular separator apparatus 40 is discussed in more detail below.

Figure 2A:
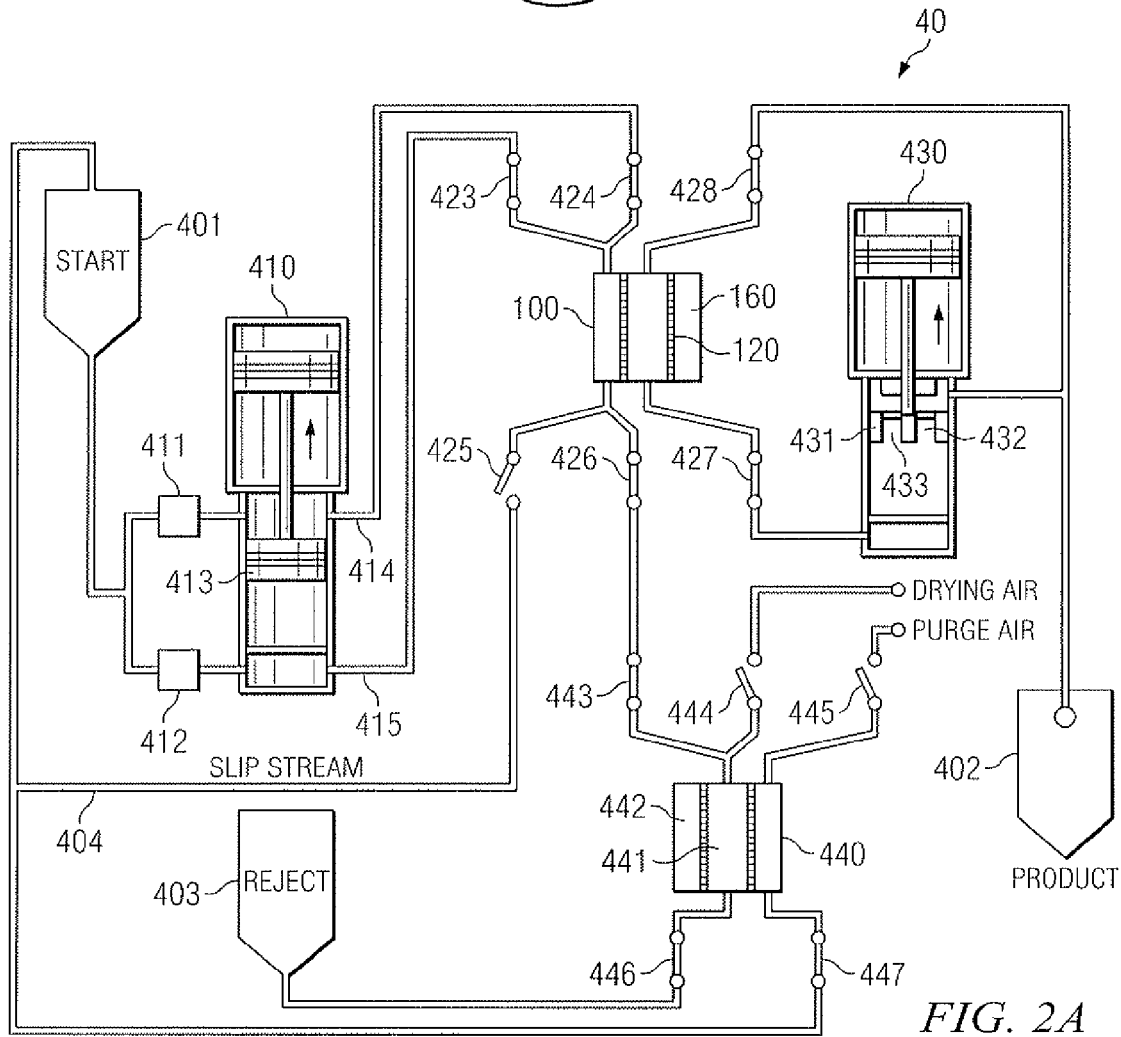
FIG. 2A is a schematic diagram illustrating the interaction of the functional components of the system in which influent fluid is treated with a single flux cartridge unit in accordance with one embodiment of the present invention.

FIG. 2A is a schematic diagram illustrating the interaction of the functional components of the system in which untreated fluid is treated with a separator containing a single flux cartridge unit in accordance with one embodiment of the present invention. Untreated fluid can be routed from a centrifuge 30 as shown in FIG. 1 or it can come directly from a storage tank 401, as depicted in FIG. 2A. The untreated fluid may contain sulfur compounds, heavy metals, carbonates, brines, salts, drilling fluids, polymers, industrial solvents, or any similar fluid or solid, in either dissolved or suspended form or both, which are to be separated from the fluid.

Figure 3:
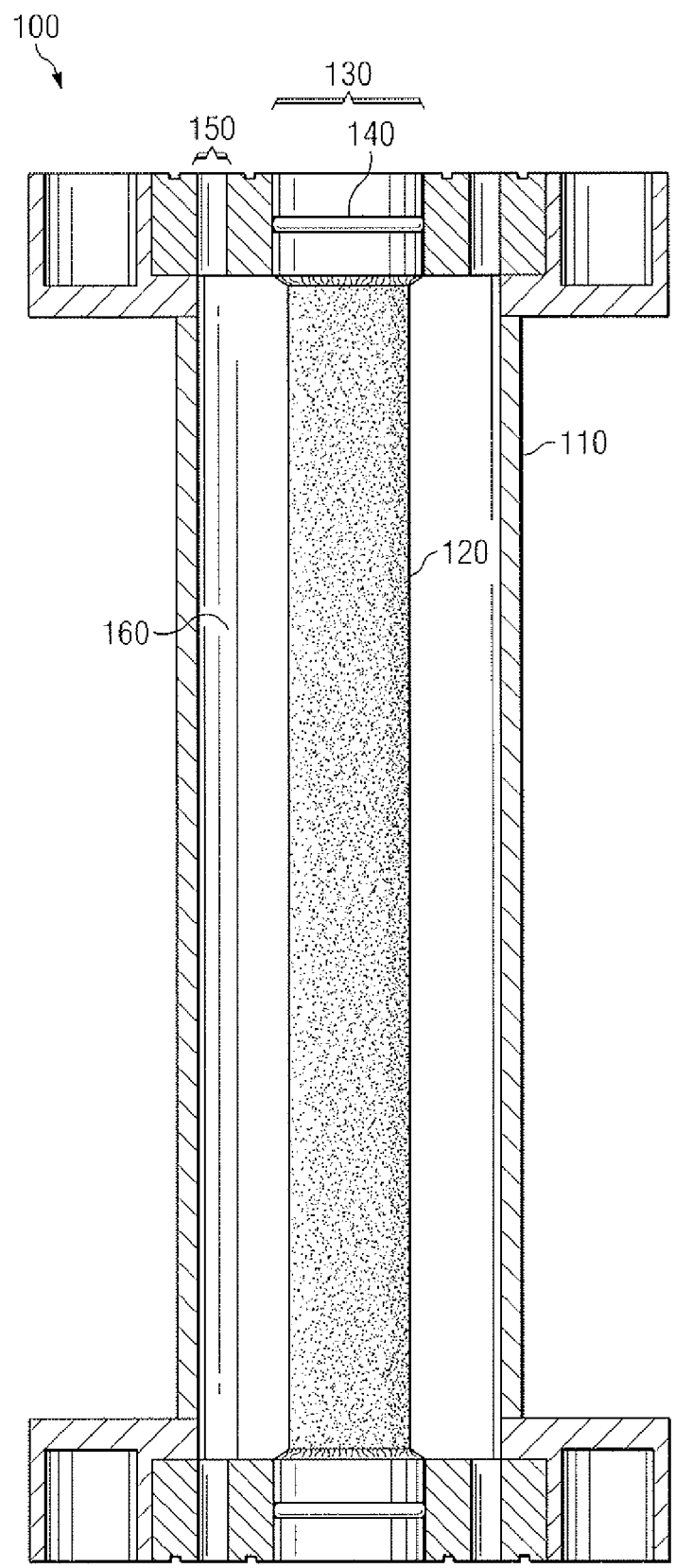
FIG. 3 is a schematic diagram illustrating a cross section of a single flux cartridge unit according to the present invention.

FIG. 3 is a schematic diagram illustrating a cross section of a single flux cartridge seated within the annulus of a separator according to the present invention. A plurality of these flux cartridges seated within corresponding annuli may be assembled in parallel or series and comprise the separator. With reference to FIG. 3, a flux cartridge unit or separator 100 comprises an outer casing 110 forming an annulus region or fluid ring 160 around a single flux cartridge 120. The outer surface of the flux cartridge 120 is shown. The inside region 130 of the flux cartridge 120 is hollow. A sealing ring 140 on the flux cartridge 120 ensures that no fluid passes between the annulus 160 and the inside region 130 of the flux cartridge 120 when the flux cartridge 120 is sealed in the separator 100.

Figure 4:
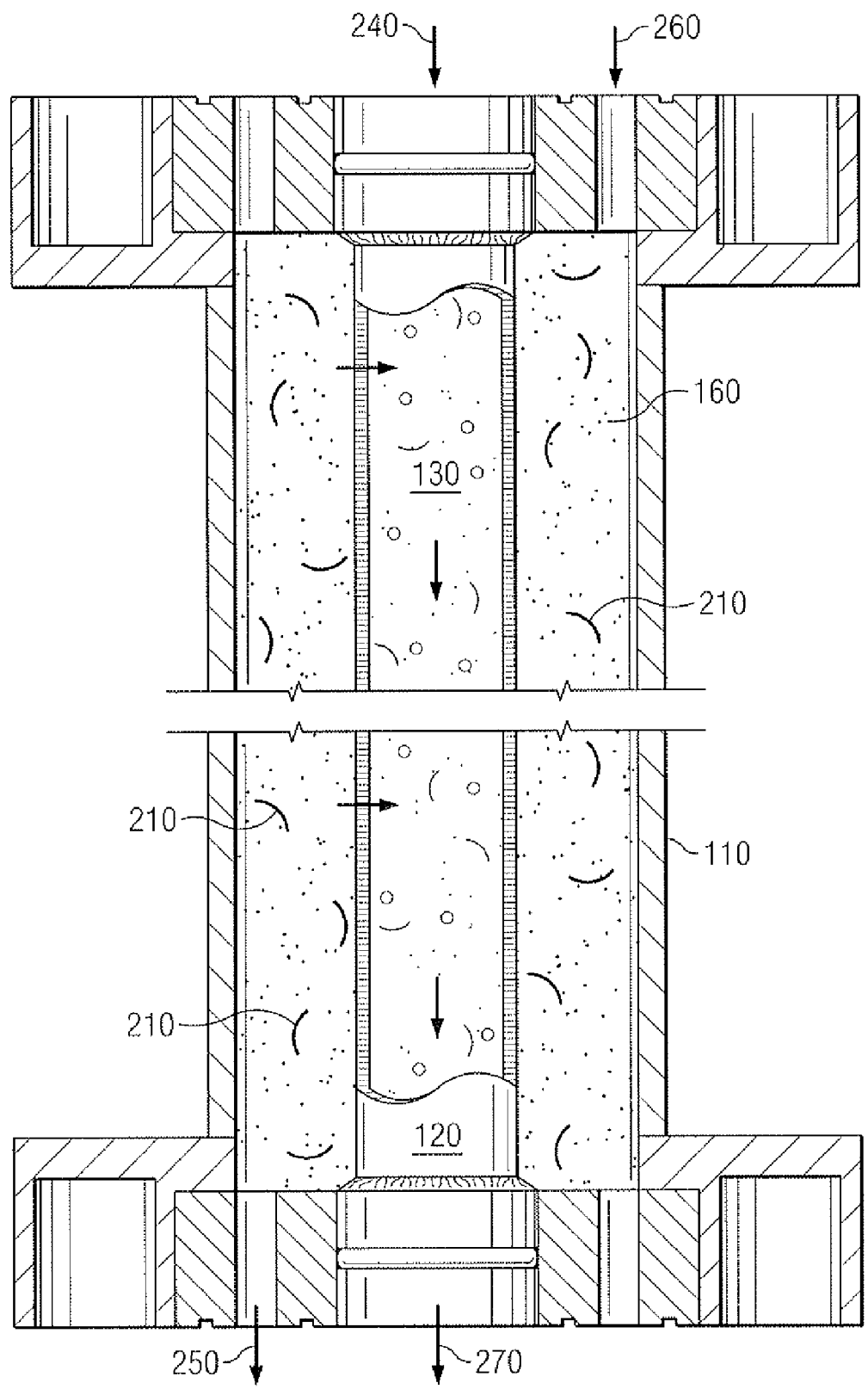
FIG. 4 provides a more detailed cross-sectional view of the flux cartridge membrane of a flux cartridge.

FIG. 4 provides a more detailed cross-sectional view of the flux cartridge membrane of a flux cartridge 120 and the filtration of untreated fluid as disclosed herein. Untreated fluid is directed into the annulus region 160 and through the flux cartridge 120 under pressure. Influent fluid enters through an entry port or region 260 under pressure. Due to the pressure differential between the annulus region 160 and the interior region 130 of flux cartridge 120, a substantial portion of contaminants are retained on the surface and within the interior fissures of the flux cartridge 120, while the desired fluid effluent or product is collected in the interior region 130 of the flux cartridge 120 and routed out of the flux cartridge 120 via fluid outlet 270. To further enhance the separation process, the pressures of the system can be manipulated by the user so that the pressure drop experienced by the fluid moving from the smaller diameter inlet 260 into the larger volume of the annulus 160 creates the formation of cavitation bubbles resulting in additional filtration and chemical effects as further discussed herein.

Referring back to FIG. 2A, in one embodiment, the filtration process begins by drawing the untreated fluid from the storage tank 401 by means of a first pneumatic pump 410. The pneumatic pump 410 alternately draws the untreated fluid through two poppet valves 411, 412 via the upward and downward motion of a plunger 413, and alternately pumps the influent fluid through two outlet lines 414, 415. Although only one separator 100 is depicted, each outlet line 414 and 415 can route fluid to a header in fluid communication with other separators 100. Referring back to FIG. 2A, pressurized untreated fluid is delivered to the separator via lines 414 and 415. The poppet valves in the valve assembly, which is in fluid communication with the separator via transition plates, control the movement of untreated fluid into the separator. As the plunger 413 rises (as shown in the present example), fluid is drawn through a poppet valve 412. Simultaneously fluid is pumped out through the upper outlet line 414. When the plunger 413 reverses direction and pushes downward, the lower poppet valve 412 closes and the untreated fluid is drawn through the upper poppet valve 411 and pumped out through the lower outlet line 415. The untreated fluid moves through the outlet lines 414, 415 to a separator 100 and specifically into the annulus or fluid ring 160. For the purposes of FIG. 2A, a single separator 100 with flux cartridge 120 inserted therein is shown for ease of illustration. In one embodiment, the separator contains eight annuli with eight corresponding flux cartridges seated therein and may be referred to as a Q-Pod. Transition plates attached to the opposite ends of each separator provide for the distribution of incoming untreated fluid, treated fluid, and backwash fluid into and out of the separator as described herein. Alternative configurations with additional or fewer annuli and flux cartridges are possible and contemplated herein.

Figure 2B:
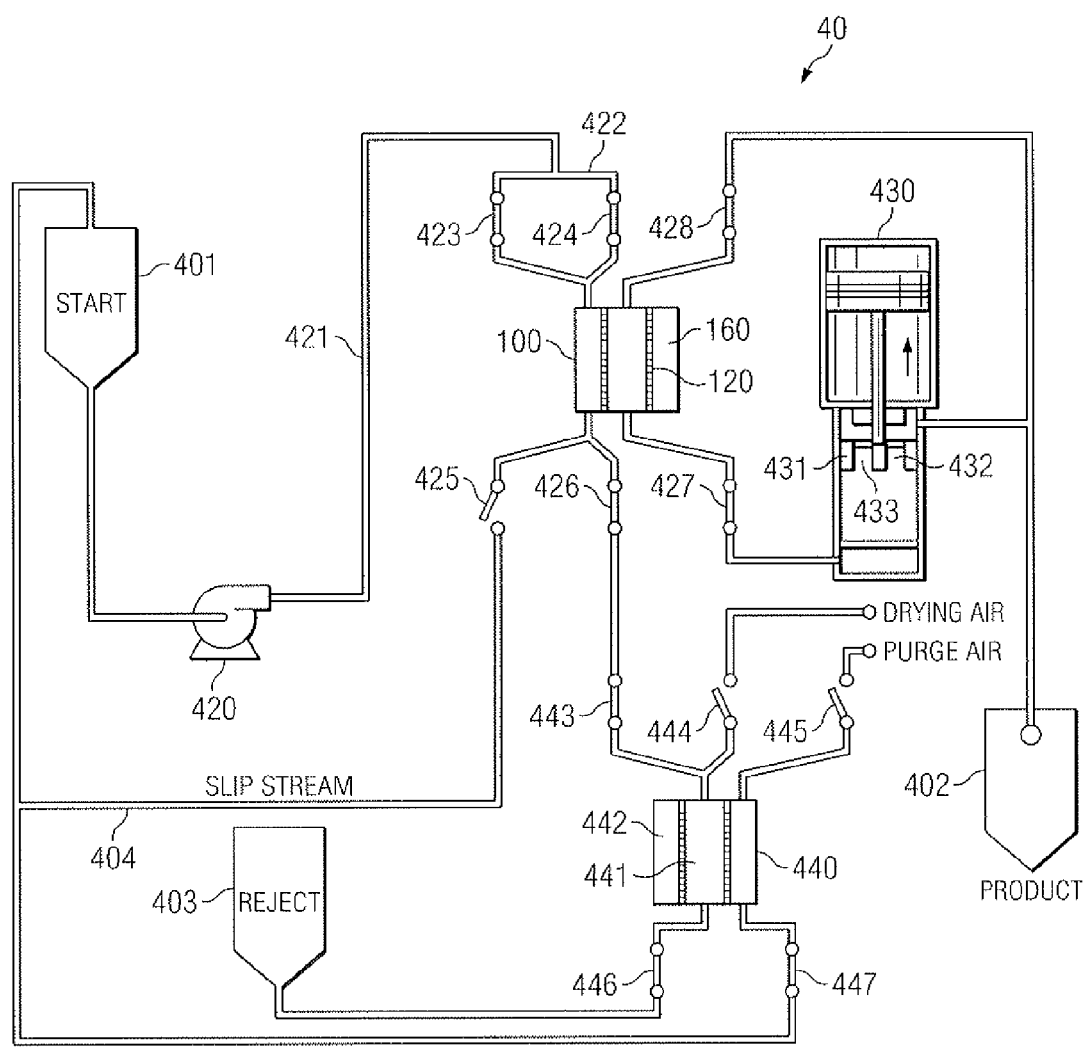
FIG. 2B is a schematic diagram illustrating the interaction of the functional components of the system in which influent fluid is treated with a single flux cartridge unit in accordance with an alternative embodiment of the present invention.

FIG. 2 is a schematic diagram illustrating the interaction of the functional components of the system in which untreated fluid is treated with a single flux cartridge unit 100 in accordance with an alternative embodiment of the present invention. Referring to FIG. 2B, a centrifugal pump 420 or other suitable pump is used to pump fluid from a storage tank 401 through an outlet line 421 and into a header 422 in fluid communication with the separator 100. Although only one flux cartridge unit 100 is depicted, the outlet line 421 can route fluid to a header 422 in fluid communication with other flux cartridge units 100.

With reference to FIG. 2A and 2B, seated within the separator 100 is a flux cartridge 120. A flux cartridge 120 comprises a membrane that assists in the separation of contaminants from the untreated fluid. A space (referred to herein as a fluid ring 160) exists between the inside surface of the separator 100 and the outer surface of the flux cartridge 120. As untreated fluid is delivered to the separator with the first pump outlet line 414, it passes through poppet valve 424 and into the fluid ring 160. When the untreated fluid is delivered with the second or lower pump outlet line 415, a corresponding poppet valve 424 closes and the fluid passes through a second poppet valve 423 and into the fluid ring 160.

Referring to FIGS. 2A, 2B, and 4, once in the fluid ring 160, the untreated fluid moves in a turbulent manner whereby contaminants are removed via pressure filtration, particle kinetics and/or hydrodynamic cavitation as discussed in greater detail herein. Fluid passes into and through the flux cartridge membrane and into the interior chamber 130 of the flux cartridge 120. Contaminant particles and larger molecules 210 are left behind as residue in the fluid ring 160, and on the exterior and within the fissures of the flux cartridge 120. The pressure supplied by the first pump 410 transports the treated product out of the center of the flux cartridge 120 through a flux cartridge exit valve 427 and into a second pump, called a pneumatic ejector pump 430. Alternatively, the treated fluid product may leave the flux cartridge 120 through an ejector bypass valve 428 and travel directly to a product collection tank 402. This ejector bypass is typically used when a single ejector pump 430 services multiple separator filter pods in alternative embodiments of the present invention.

During the filtration cycle described above, the ejector pump plunger 431 is drawn up (as shown in FIGS. 2A and 2B) into a charged "ready" state. Next, check valves 432, 433 that are built into the plunger's disc are opened. In this position, the check valves 432, 433 allow the treated product coming from the flux cartridge 120 to pass by the plunger 431 and out of the ejector pump 430 and into the product collection tank 402. The filtration cycle continues for each annulus/flux cartridge within the separator pod for a pre-determined time period (e.g. 20-25 seconds) or until separation efficiency declines below a pre-determined level. At the end of this separation cycle period, each annulus/flux cartridge within the separator is backwashed and cleaned with a reverse flush (ejection cycle). The annuli/flux cartridges can be backwashed all at once, or programmed to backwash individually at the desired interval or designated pressure differential, thereby allowing the system to maintain continual filtration in select annuli/flux cartridges while backwashing other individual annuli/flux cartridges at the same time. Alternatively, a sensor assembly may be employed to measure the pressure drop across the flux cartridge or other appropriate location. When the pressure differential becomes excessive, or reaches a certain value, the sensor assembly sends a corresponding signal to the central controller which initiates reverse flush operations (ejection cycle). Such sensor assemblies are known in the art and further description thereof is considered unnecessary.

Referring to FIG. 2A, the reverse flush operation or ejection cycle begins by stopping the first pump 410 and shutting the poppet valves 423, 424 at the top of the separator 100 of the separator filter pod. In another embodiment wherein multiple separators (not shown) are serviced by first pump 410, first pump 410 continues to operate while each individual separator 100 or alternatively, each individual and annulus/flux cartridge is taken offline for the reverse flush cycle. In the embodiment using the centrifugal pump 420 depicted in FIG. 2B, the pump 420 is not shut off as it is still serving other separators (not shown) when one or more of the separators is in the backwash cycle. Next, the pneumatic ejector 430 is activated and its plunger 431 is driven downward. This motion closes the plunger's check valves 432, 433 and stops the flow of treated fluid past the plunger 431, allowing the plunger to exert pressure on the fluid inside the ejector. Clean rinse fluid is transported back through the flux cartridge exit valve 427, through the flux cartridge 120 and into the fluid ring 160. The time period for this reverse ejection flush or ejection cycle is approximately 0.35 seconds and is carried out under higher pressure than the normal filtration cycle driven by pump 410. For example, the pressure exerted on the untreated fluid by the first pump 410 may be up to 150 psi (1.03 MPa) depending on the viscosity and other physical characteristics of the fluid involved. In contrast, the pressure exerted by the ejector 430 during the reverse flush may be up to 300 psi (2.06 MPa). This quick, high-pressure reverse burst removes contaminant particles and residue remaining within the fissures and outside surface of the flux cartridge 120 and re-homogenizes the particles and residue in the fluid ring 160. By utilizing treated fluid to clean the separator(s), there is no need for an external backwash fluid source.

In the next phase of a typical cycle, a poppet valve 426 on the bottom of the separator 100 is then opened to allow the pressurized contaminant particles and residue solution to flush out of the fluid ring 160 and into a concentrator annulus 442 or directly to a reject collection tank 403. The concentrator annulus 442, as its name suggests, concentrates the material backwashed and flushed from the separator 100 by removing a significant portion of the flush fluid used during the ejection cycle. Unlike the separator filter pod, which may contain up to eight annuli in the preferred embodiment, the concentrator 440 contains only one annulus with a flux cartridge 441 seated therein in a preferred embodiment. The flushed contaminant waste enters the concentrator annulus 442 through an open poppet valve 443 and into the interior chamber of the concentrator's flux cartridge 441. The desired effluent fluid passes through the membrane of the flux cartridge 441 and into the fluid ring 442, leaving the concentrated contaminant waste residue in the interior chamber of the flux cartridge 441. A fluid return poppet valve 447 in connection with the bottom or one end of the separator annulus 442 allows the treated fluid in the fluid ring 442 to return to the starting tank 401. Next, the poppet valve 443 through which the waste fluid entered the separator 440 is closed and a drying air poppet valve 444 is opened to let drying air into the interior chamber of the separator flux cartridge 441. This drying air provides a mechanism to dewater the concentrated waste and drives additional flush fluid through the flux cartridge 441 membrane and through the return poppet valve 447. Consequently, in one embodiment, the contaminant removed from the concentrator is substantially dry. In one embodiment, the substantially dry contaminant is removed from the concentrator by a purge air source.

The drying air poppet valve 444 and fluid return poppet valve 447 are then closed and a purge air poppet valve 445 is opened to allow in pressurized purging air into the separator 440. When the air pressure inside the separator 440 reaches a pre-determined or desired level (e.g. 110 psi), the poppet valve 446 is opened which allows the waste residue inside the flux cartridge 441 to escape into a waste collection tank 403. In one embodiment, a plurality of poppet valves are cycled incrementally to control the flow of fluid through the separator. In alternative embodiments, a settling tank may be used in place of the separator 440 to permit untreated fluid to be recycled back into the tank 401 or to produce a final product.

Figure 5A:
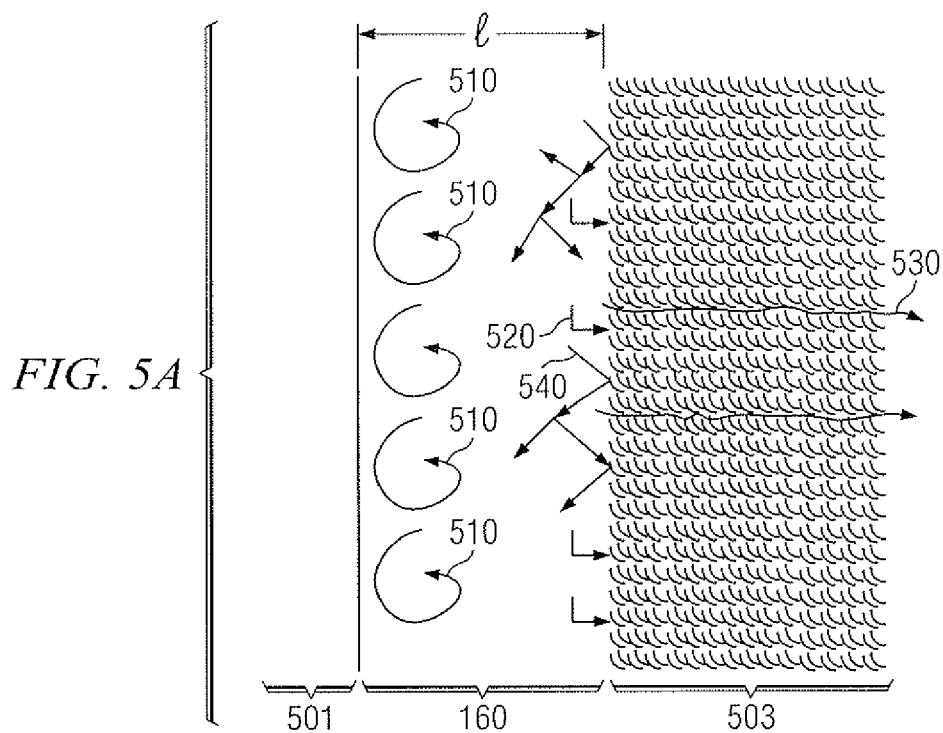
FIG. 5A is a cross-section view of the filter membrane of the flux cartridge inside the annulus of a separator.

Referring now to FIG. 5A, a portion 503 of a single flux cartridge 120 as shown in FIGS. 2-4 illustrates filtration in more detail according to one embodiment of the present invention. The flux cartridge 120 comprises the membrane that filters the contaminants from the untreated fluid 501, 160. In one embodiment, the porous matrix of the filter membrane 503 is created by pressing or sintering metal powder, metal fibers, woven metal mesh, or any combination of these materials, at high pressure and then annealing it using well-known metallurgical techniques known in the metallurgical art. In alternative embodiments, the filter membrane 503 may consist of ceramic materials, high strength plastics and other known material as known in the art.

This type of filter membrane provides filtration at both its surface and in its depth. Specifically, although the pores at the surface of the filter membrane 503 may be larger than the filter specification, the flow path through the filter is tortuous and contaminant particles are intercepted by the metal media. Sintered metal media typically exhibit a high porosity and, therefore, high flow rate and low pressure drop with excellent contaminant particle retention. In one embodiment, the present invention uses a lower membrane thickness than those typically found in the prior art (e.g. 0.125 inches (3.2 mm) instead of a prior art membrane thickness of about 0.40 inches (10 mm)). A thinner filter membrane 503 produces a much higher flow rate of fluid through the filter membrane. Lower thicknesses may also be utilized, in part, because of the controlled fluid turbulence which is present in the fluid ring 160 during operation of the invention disclosed herein. In the disclosed embodiment, the preferred fluid ring length (l) is 0.125 inches (3.2 mm) when used in conjunction with a flux cartridge diameter of 0.375 inches (9.5 mm). These dimensions have been found to optimize the volume of reverse flush fluid required to clean the separator annuli and to minimize the amount of reverse flush fluid required to clean the separator annuli. To obtain effective filtration and reverse flush efficiencies utilizing the apparatus embodiment described herein, the desired ratio of fluid ring length (l) to the diameter of flux cartridge utilized is typically 1 to 3, when using a 0.375 inch (9.5 mm) diameter flux cartridge.

The turbulent flow of the untreated fluid in the fluid ring 160 is represented by a curved arrow 510. This turbulent flow is created and controlled by the pressure differential and the rhythmic pumping action of the pneumatic pump (pump 410 in FIG. 2A) and actuation of the poppet valves within the valve head assemblies of the separator. As the outlet stream poppet valves (i.e. 423, 424 in FIG. 2A) of the first pneumatic pump open and close with the pumping action, a temporary drop in pressure in the fluid ring 160 is caused when the poppet valves switch position (open or closed), creating a sudden velocity differential and corresponding pressure drop in the fluid ring. This effect is magnified by the suction and pulsing action after each infusion of fluid as the poppet valves open and close. As a result, fluid pulses up and down within the fluid ring 160 resulting in the turbulence represented by the arrows 510 in FIG. 5A. This turbulence is again magnified by the high velocity of the fluid moving through the relatively small volumetric space in the fluid ring.

Laminar flow consists of fluid flowing in straight lines at a constant velocity. If the fluid hits a smooth surface, a circle of laminar flow results until the flow slows and becomes turbulent. At faster velocities, the inertia of the fluid overcomes fluid frictional forces and turbulent flow results producing eddies and whorls (vortices). The present invention uses turbulent fluid flow for improved molecular and particle kinetics such that only the desired, smaller molecules 530 (e.g. fluid) pass through the membrane matrix 503. In one embodiment, to pass through the fissures of the flux cartridge membrane 503, a molecule in the fluid ring 160 has to enter interstices or fissures at almost a 90 degree angle or perpendicularly to the surface of the membrane 503 when the molecule enters the membrane (as represented by the arrow at a right angle 520). Due to the constant fluid turbulence, only the lighter molecules are able to make this turn quickly enough to pass through the membrane 503 and enter the interior chamber of the flux cartridge. Heavy molecular contaminants (e.g. suspended solids, iron complexes, oil and grease) cannot turn fast enough to reach the appropriate entry vector or angle when they contact the membrane 503. As shown in FIG. 5A, when heavier molecules hit the uneven surface of the membrane surface, rather than pass through, they careen off and strike similarly sized molecules, causing them in turn to scatter and thereby increase the kinetic energy present in the fluid ring between the annulus and flux cartridge. This kinetic pattern is illustrated by arrow 540. In the absence of fluid turbulence or when laminar fluid flow conditions exist, the heavier molecules in the fluid would lose a majority of their kinetic energy and would not be able to enter the membrane. Thus, fluid turbulence is necessary to keep the heavier molecules bouncing off the surface of membrane 503. As fluid turbulence increases, the smaller a molecule has to be in order to be properly oriented to pass through the membrane 503. Therefore, the filtration of smaller molecules can be accomplished by using a flux cartridge with a less porous membrane matrix by increasing the fluid turbulence within the separator fluid ring 160 or by a combination of the two.

The present invention also provides a novel method of achieving the filtration by membrane emulation since the filtering effects of a smaller membrane matrix can be achieved without actually changing the porosity of the flux cartridge interstices. Referring back to FIG. 2A, a slipstream poppet valve 425 controls the flow of fluid from the separator fluid ring 160 to a slipstream fluid hose or path 404 that feeds back to the start tank 401. During membrane emulation, this slipstream poppet valve 425 is opened while the first pneumatic pump 410 is pumping pressurized untreated fluid into the separator fluid ring 160, which allows the untreated fluid to move through the fluid ring 160 at a faster velocity due to the increased pressure differential. When the poppet valve 425 is opened, flow in the fluid ring 160 is substantially vertical in the depicted orientation of the separator. Due to frictional forces imparted by the inner and outer circumference of the fluid ring 160 on the influent fluid, the velocity profile is parabolic meaning that the influent fluid velocity increases as the distance away from the either the inner or outer circumference increases. Consequently, particles will agglomerate on the surface of the flux cartridge 120 as "cake" thereby continually decreasing the effective pore size of the flux cartridge. In effect, this reduces the size of particles which are able to pass through the reduced "cake" pore space of the flux cartridge 120. As a result, the ability to create this condition on the flux cartridge allows the operator to "emulate" a filter porosity which is smaller than the physically measured porosity of the flux cartridge 120. With this membrane emulation technique, the present invention is able to turn, for example, a five micron flux cartridge into the functional equivalent of a one micron flux cartridge by manipulating the pressure and flow conditions existing in the separator fluid ring 160 due to the large pressure differential created by the slipstream path 404.

The present invention also provides a way to remove dissolved materials such as brine from untreated fluid utilizing hydrodynamic cavitation. Cavitation is defined as the formation, expansion, and implosion of microscopic gas bubbles in liquid. Cavitation occurs in a fluid when the static pressure of a fluid falls below its temperature-related vapor pressure. A forceful condensation or implosion of the bubbles occurs when the fluid reaches a region of higher pressure.

There are generally three regions where chemical and physical phenomena occur in cavitation: (1) the gas phase within the cavitation bubble where elevated temperature and high pressure are untreated, (2) the interfacial zone between the bubble and the untreated fluid or solution where the temperature is lower than inside the bubble but still high enough for certain reactions to occur, and (3) the untreated fluid at ambient temperature wherein reactions and diffusion are taking place. Without being bound by theory, it is believed that the turbulent forces existing during the filtration cycle of the present invention create pulsating energy waves that cause hydrodynamic cavitation to occur in the separator which results in both physical and chemical changes to contaminants in the influent fluid, such as dissolved matter, hydrocarbons and more complex chemical structures. During the cavitation phase, very localized, extremely high temperatures (perhaps greater than 5000 K) ("hot spots") and pressures (perhaps greater than 1000 atm) are created within the fluid bubbles during the collapse of microscopic vacuoles. Due to the presence of these pressure and temperature extremes, the influent fluid is subjected to various physical and chemical phenomena including, but not limited to, ionic/covalent bond destruction, flocculation, precipitation, the creation of free radicals, oxidation reactions and other chemical physical phenomena. Under these extreme conditions, it is believed that organic compounds are decomposed. Other compounds or species present in the surrounding fluid also undergo reactions comparable to those found in standard high temperature combustion reactions. Cavitation reactions may result in the creation of free radicals which in turn promote oxidation reactions that decompose organic species in the untreated fluid. For example, cavitation of fluid can cause dissociation of fluid into hydrogen and hydroxide. The free hydroxyl radical OH is a powerful oxidizing agent and can facilitate removal of dissolved organic material from the treated fluid. Oxidation caused by hydrodynamically inducing cavitation is known to be orders of magnitude stronger than oxidation caused by the ultrasonic induction of acoustic cavitation.

It is also believed under such a hot-spot model that the maximum temperature realized in a collapsing bubble decreases as the thermal conductivity of the dissolved or entrapped gases increase. Because higher hot spot temperatures are believed to be more advantageous for the degradation of some contaminants, in one embodiment the thermal conductivity of the dissolved gases in the fluid ring 160 is physically or chemically lowered. For example, to physically lower the thermal conductivity, in one embodiment air or other gas is cooled prior to being supplied to the fluid ring 160. In one embodiment, the separator 100 unit is cooled by any suitable method known in the art.

Figure 5B:
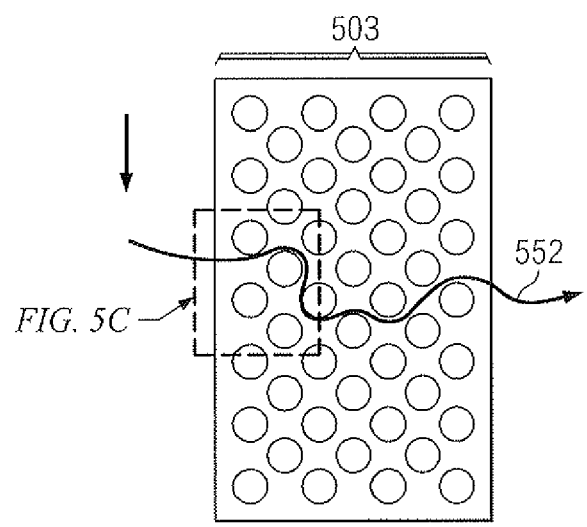
FIGS. 5B-5C provide a more detailed prophetic view of the tortuous path the influent fluid travels as it is forced through the separation media.
Figure 5C:
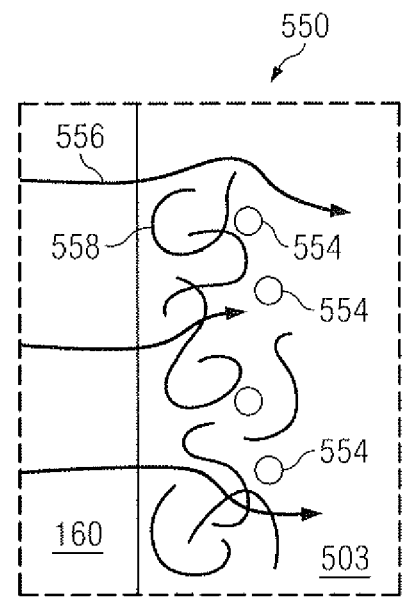

FIGS. 5B-5C provide a more detailed view of the tortuous path the influent fluid travels as it is forced through the separation media, in accordance with one embodiment of the present invention. As discussed above, cavitation is defined as the formation, expansion, and implosion of microscopic gas bubbles 554 in liquid. The shockwaves created by the cavitation may accelerate particles 556 to high velocities and increase inter-particle collisions and particle kinetics. Additionally, localized spots of high temperature and high pressure gradients temporarily exist during the final phase of bubble implosion. The presence of these localized high temperature and high pressure gradients, in addition to the kinetic energy formed by the shockwaves, may encourage the decomposition of larger molecules by both mechanical and thermal means. For example, the mechanical energy imparted on large molecules, such as oil, grease or polymers in the filter media may be analogous to pushing, extruding, or forcing a large circular molecule through a smaller "pipe or pore" and may force the intra-molecular bonds to be overcome. Cavitation may also occur or be present in the inner fissures or interstices of the flux cartridge membrane and/or the interior of the flux cartridge in the vicinity of the flux cartridge membrane during the filtration cycle or in the vicinity of the fluid ring during the ejection cycle.

Referring back to FIG. 5A, as the treated fluid passes through the interstices of membrane 503 cavitation results and gas bubbles are untreated. When these gas bubbles reach the inner fissures of the flux cartridge and membrane 503 (e.g. arrow 530) they begin to rapidly implode. During this implosion process, similar and dissimilar molecules flocculate and form precipitates. Molecular bonds are broken and free radicals are created further enhancing the filtration process. Another effect on untreated fluid by the separation media is the breakup of emulsions in the treated fluid. As the influent fluid is pushed through the separation media or flux cartridge membrane 503 under pressure and, as cavitation reactions occur, emulsions in the fluid are broken. By using different size filter matrices and fluid velocities, the present invention is capable of separating particles 300 microns in size and smaller. The different flux cartridge porosities which may be utilized provide a variety of conditions that can be manipulated to cause desired amounts and rates of cavitation.

With reference to FIG. 5A, large particles in the untreated fluid can build up along the outer perimeter of the flux cartridge 120 in the fluid ring 160. Such build-up is especially likely to occur at the first filter pod or when there is a step change to a filter pod having a flux cartridge membrane with a smaller micron filter matrix. As a result, the first filter pod to process untreated fluid or the first filter pod where there is a step change in the micron size of the filter matrix may function more as a traditional pressure filter by mostly removing suspended solids than as a cavitation device. Such build-up material can be backflushed by a pressure exerted on fluid, for example, by a first pneumatic ejector 430 (shown in FIG. 2A) through the flux cartridge 120 and into the fluid ring 160.

The separation apparatus and method disclosed herein can be enhanced with the addition of various other separation methods to the separator as discussed in detail below.

Biocide

In one embodiment, the filter membrane 503 comprises a ceramic flux cartridge. Ceramic flux cartridges are known in the art and are available from vendors such as Doulton USA of Southfield, Mich., USA. In one embodiment, filter membrane 503 acts as a biocide to destroy biological material in the untreated fluid. In one embodiment, the flux cartridge is impregnated with a biocide. In one embodiment, the filter membrane 503 further comprises a colloidal silver-impregnated ceramic filter. Such impregnated filters are known in the art as illustrated by U.S. Published Patent Application No. 2007/0110824, which is hereby incorporated by reference. Other methods of manufacturing filter membranes 503 incorporating a biocide will be apparent to those of skill in the art.

Electrochemical Cell

Figure 5D:
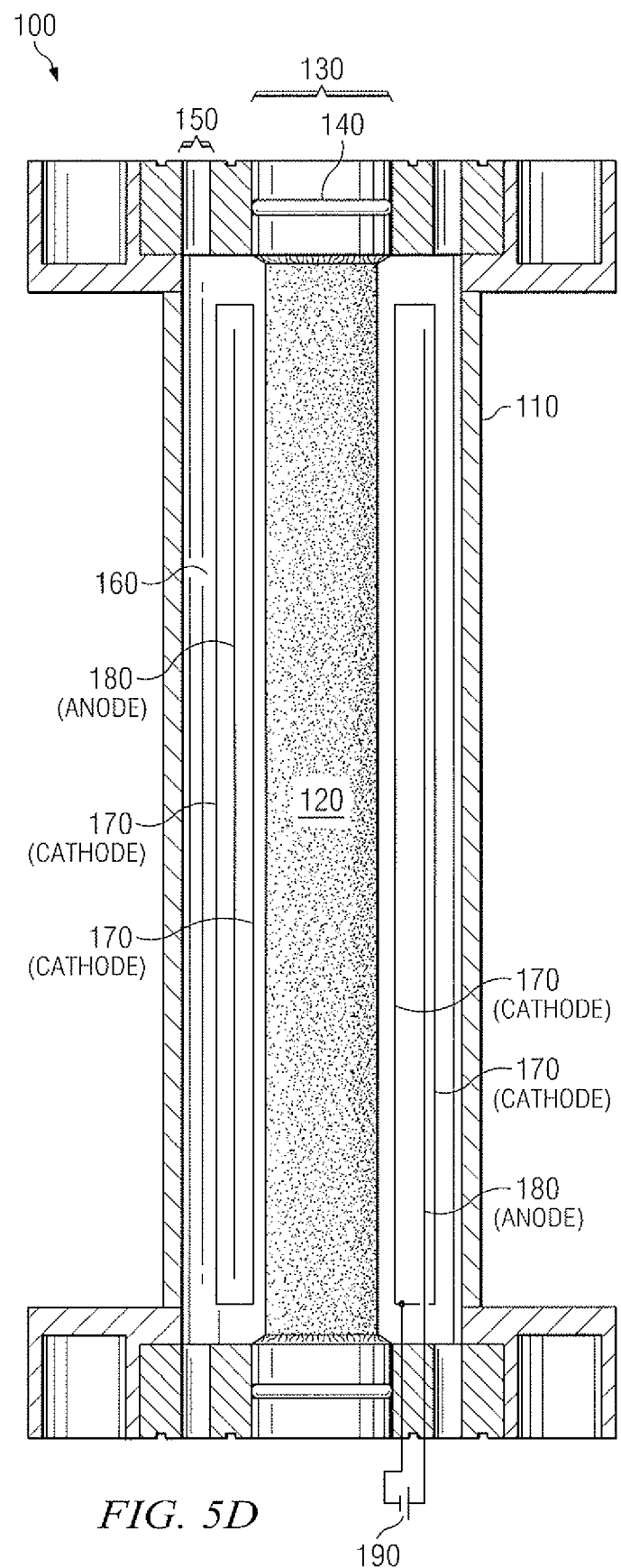
FIG. 5D is a schematic diagram illustrating a cross section of a single flux cartridge unit comprising an electrochemical cell according to one embodiment of the present invention.

FIG. 5D is a schematic diagram illustrating a cross section of a single flux cartridge unit comprising an electrochemical cell according to one embodiment of the present invention. In one embodiment, the flux cartridge 100 comprises two or more electrodes and an electrical current source. As shown in FIG. D, in one embodiment, the flux cartridge 100 comprises two cathodes 170, one anode 180 between the two cathodes, and an electrical current source 190. Such cells are known in the art as exemplified by WO 99/16715 and U.S. Pat. No. 4,384,943, both of which are hereby incorporated by reference in their entirety. In one embodiment, the electrodes 170, 180 are circumferential plates and can be perforated to facilitate the flow of fluid within the fluid ring 160. As shown in FIG. 5D, a cathode 170 is on each longitudinal side of the anode 180. However, such embodiment is provided for purposes of illustration and not limitation and any suitable arrangement can be used. In an embodiment not shown, the casing 110 itself can be an electrode. In one embodiment, the anode 180 can be made of titanium coated with a catalytic coating or can be made of another suitable metal. In one embodiment, the cathode 170 can be made of steel. In one embodiment, the electrochemical cell is used to precipitate out metals and dissolved constituents in the fluid in the fluid ring during the separation cycle which is then removed via the backwash ejection cycle described herein. Likewise, if sufficient current is used, the electrochemical cell is used to destroy biological material within the fluid ring 160.

Electromagnetic Field

Figure 5E:
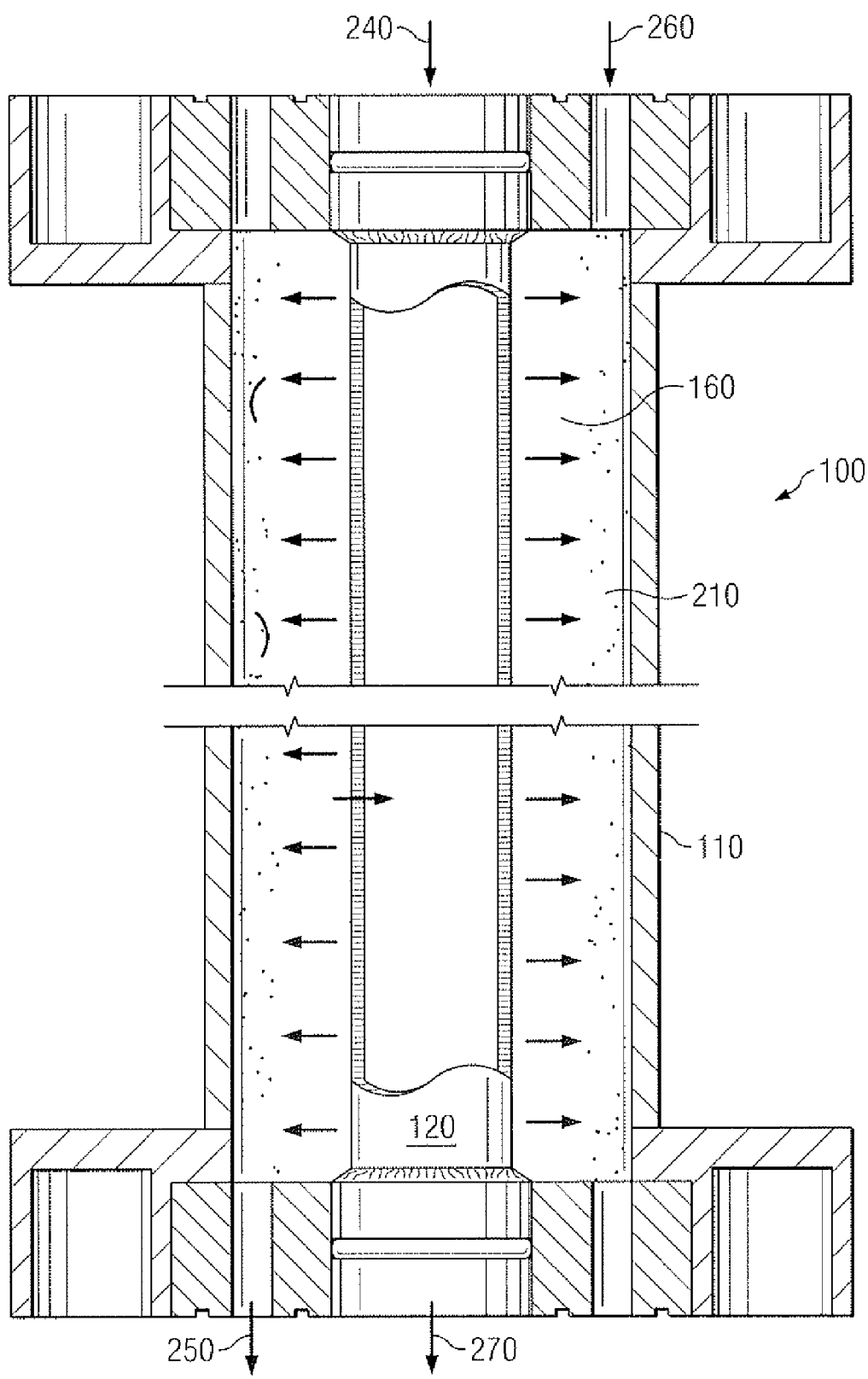
FIG. 5E provides a more detailed cross-sectional view of the flux cartridge subjected to a magnetic field in accordance with one embodiment of the present invention.

FIG. 5E provides a more detailed cross-sectional view of the flux cartridge subjected to a magnetic field in accordance with one embodiment of the present invention. In one embodiment, the untreated fluid is subjected to a magnetic force, magnetic field or magnetic gradient upon entry into the fluid ring of a separator to collect or agglomerate solid particles affected by such magnetic field. Such filtration methods are known in the art as disclosed in U.S. Patent Publication No. 2006/0191834, which is hereby incorporated by reference in its entirety. The magnetic force can significantly affect particle movement during the filtration process, in some cases contributing to the formation of a filter cake on the surface of the flux cartridge (not shown) and/or on the inner surface of the outer casing 110 as depicted in FIG. 5E. When the particles agglomerate into larger molecules 210, there is an increase in their effective diameter in turn increasing the filtration efficiency of the flux cartridge unit. The magnetic field can be applied at any angle to the direction of pressure driving the untreated fluid through the flux cartridge, whatever proves most effective for the fluid undergoing filtration. The field can be applied parallel, perpendicular, or at any angle in relation to the direction of fluid flow. The means for subjecting a magnetic field or gradient to the untreated fluid may include a solenoid attached to or contained within the filter pod or flux cartridge or a permanent magnet internal of external to the filter pod and/or flux cartridge. Typical ranges of homogenous magnetic field strengths which would be useful in this application are greater than 0.01 T.

In one embodiment, the flux cartridge 100 is subjected to a magnetic field such that when fluids having magnetic materials such as iron filings, enter the annulus, the magnetic field can be activated so that the magnetic materials are moved outwardly in the direction shown by the arrows. Consequently, the magnetic materials are attracted toward and retained on the outer casing 110 in the fluid ring 160. Then, just prior to or immediately after the backwash operation is initiated, the field can be released and the retained magnetic materials are flushed out of the annulus during the backwash ejection cycle.

Acoustic Cavitation via Ultrasound

In one embodiment, the hydrodynamic cavitation caused by the manipulation of pressures within the separator and filter medium is coupled with acoustic cavitation to further enhance the overall cavitation reaction that occurs in the molecular-separator. In one embodiment, an ultrasonic wave source is coupled to the flux cartridge 100 to create acoustic cavitation. As used herein, "acoustic cavitation" is defined as ultrasonically-induced cavitation. Stated differently, "acoustic cavitation" is the formation, growth, and collapse of bubbles occurring as from an ultrasound source. Ultrasonically-induced cavitation can be provided by an ultrasound probe inserted into the fluid ring of the flux cartridge 120. In one embodiment, the filter membrane 503 comprises one or more ultrasonic probes to facilitate acoustic cavitation.

There are two types of acoustic cavitation—stable and transient. Transient cavitation occurs at greater acoustic pressures, where bubbles violently implode after a few cycles. This implosion can have a number of effects, including transiently raising the local temperature by hundreds of degrees Celsius and the local pressure by hundreds of atmospheres, emitting light by the phenomenon called sonoluminescence, creating short-lived free radicals, which in turn promote oxidation reactions that decompose organic species in the untreated fluid. Acoustic cavitation can affect a number of acoustic chemical and biological changes in a liquid. Consequently, in one embodiment, transient acoustic cavitation is used to destroy the biological material in untreated fluid. Transient acoustic cavitation can occur at frequencies between about 20 and about 350 kHz. Stable acoustic cavitation can occur at low-pressure portions of an ultrasound wave and can occur at frequencies between about 700 and 1000 kHz. Because stable acoustic cavitation bubbles have less time to grow, they are smaller and therefore result in a less vigorous implosions and collapse than occurs in transient acoustic cavitation.

Example of Untreated Fluid Treatment Array

Figure 6A:
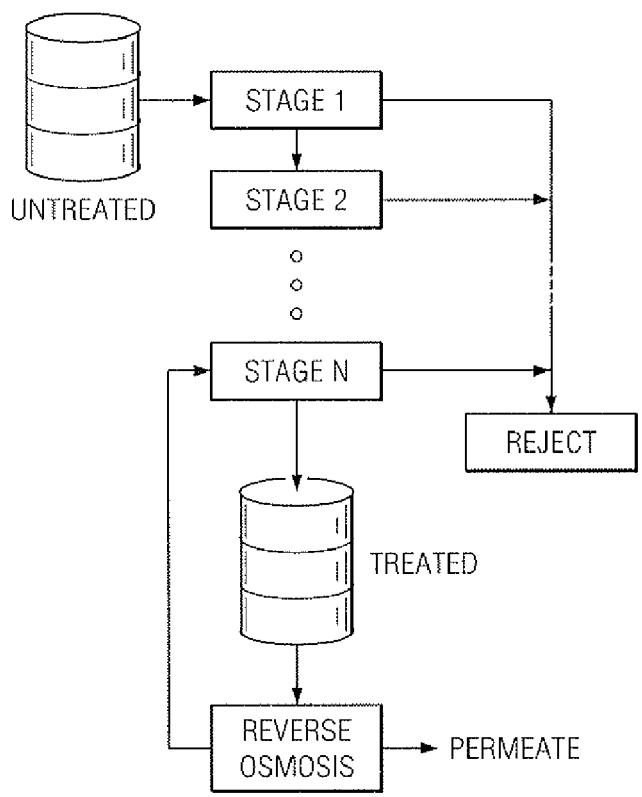
FIGS. 6A-6C show the use of multiple stages or passes of influent fluid through the apparatus (or series of apparati) in series, parallel and in combination, respectively.

FIG. 6A is a schematic diagram of one embodiment of the present invention depicting multiple treatment stages in series. With reference to FIG. 6A, untreated fluid is passed in series through multiple separator filter pods or stages. Impurities are concentrated and collected from one or more stages into a separate receptacle. Treated fluid is collected at the end of the stages in series. Stages can be added as desired to further filter impurities from untreated fluid. Each stage may contain a flux cartridge having the same porosity (e.g. five microns). Alternatively, successive stages may have successively smaller or successively larger porosities. Further, successive stages may have an apparent random variation of porosities which are selected by experimentation so as to effect a desired separation or filtration depending on the chemical and physical makeup of the untreated fluid. For example, a first stage may use 1 one hundred micron flux cartridges while a second stage may use five micron flux cartridges. Any number of successive stages in series may be used until desired fluid purity is obtained. A reverse osmosis system can then be used to remove any remaining dissolved solids in the fluid.

Figure 6D:
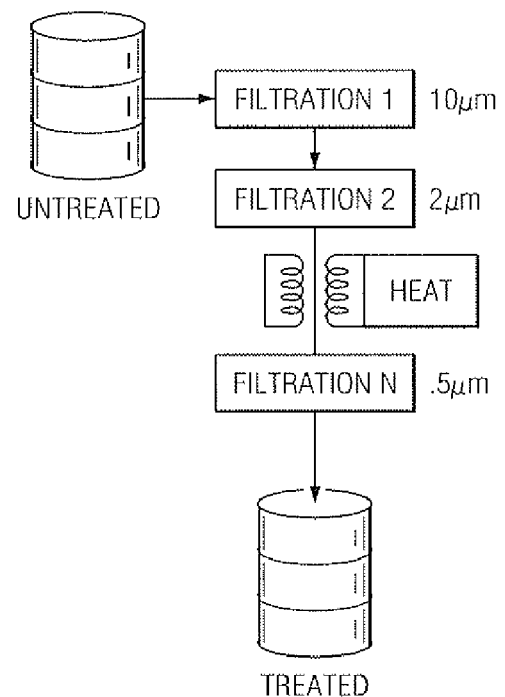
FIG. 6D shows the use of heat to improve the removal of contaminants from influent fluid as it passes through the filtration stages; and, FIG. 7 is a schematic of a multi-stage filtration system wherein there is a first set of apparati in series and then a second set of apparati in parallel according to one embodiment of the present invention.
Figure 6B:
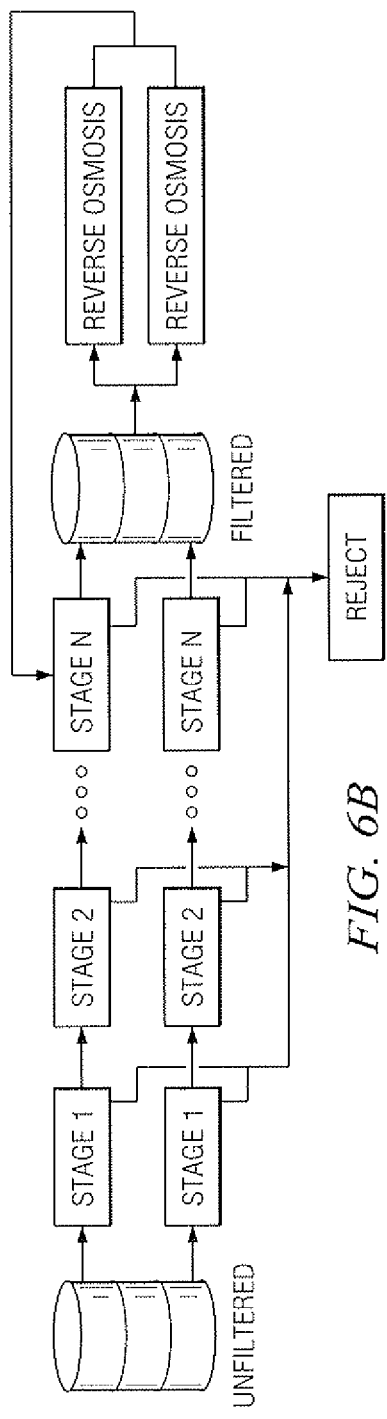

FIG. 6B is a schematic diagram of another embodiment of the present invention depicting multiple stages in series and in parallel. With reference to FIG. 6B, the capacity to filter contaminated fluid can be increased by adding stages in parallel. Also, the degree of filtration and resultant treated fluid can be similarly controlled by adding stages as desired in series. A reverse osmosis system can then be used to remove any remaining dissolved solids in the fluid. In one embodiment, the treated fluid in FIG. 6A or the filtered fluid in FIG. 6B can be further treated with a hydrocarbon removal media such as activated carbon and/or other suitable material such as is available from Mycelx Technologies Corporation of Gainesville, Ga., USA.

Figure 6C:
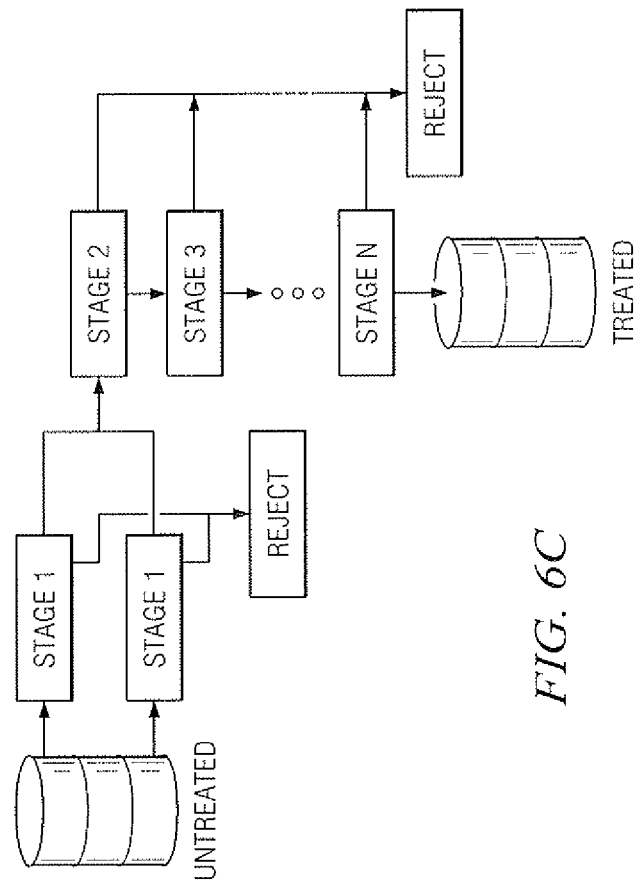

FIG. 6C is a schematic diagram of one embodiment of the present invention depicting multiple first stages in parallel and the remaining stages in series. With reference to FIG. 6C, untreated fluid is fed into multiple filter pods at stage one before being combined and sent through a single pod for each of the remaining stages. The treated product is collected at the end of the process. The concentrated impurities are taken from stage one and from each of the stages. Any number of pods or stages, such as the arrangement shown in FIG. 6C, may be assembled into a unified functioning apparatus.

The embodiment shown in FIG. 6C is especially advantageous if there are large amounts of relatively large suspended solid impurities in the untreated fluid which clog the pores of the first set of flux cartridges. The impurities are drawn off at the first stage by ejection cycles. Further, it may be desirable to operate the filtration and ejection cycles at a much greater frequency in the earlier stages to further ensure that particles and impurities do not excessively become bound in the pores of the flux cartridges. The filtration and ejection cycles at each stage may be performed at any rate at any given stage whether the stages are in parallel or in series.

FIG. 6D is a schematic diagram depicting a series of filter stages having decreasing filter membrane sizes and a heat source. With reference to FIG. 6D, filtration of untreated fluid is improved by the use of heat to lower the viscosity of the aqueous solution. The lower viscosity improves the flow of fluid through the filter membranes and especially through the smaller porosity filter membranes. Lowering the viscosity also lowers the resistivity of the fluid and permits suspended contaminants to settle out of solution where they can be more easily backflushed during an ejection cycle into a settling tank (not shown).

It should be further noted that the various streams and/or flux cartridge can also be cooled to cause contaminants such as polymers or flocking agents (common constituents in drilling fluids) in the untreated fluid to become brittle and/or precipitate out of solution in the fluid ring. Consequently, in one embodiment, one or more of the flux cartridges comprising the first stage are cooled to precipitate out contaminants in the fluid ring. In one embodiment, the untreated fluid is cooled prior to entering the fluid ring to precipitate out components prior to entering the first separator.

Ultraviolet Disinfection

It should be further noted that other treatment technologies besides heat can also be applied in unit operations placed in before, between or after molecular separators as depicted by the heat source in FIG. 6D. For example, in one embodiment, ultraviolet radiation (UV) is used to break down organic contaminants and inhibit bacterial growth. UV disinfection transfers electromagnetic energy from a mercury arc lamp to an organism's genetic material (DNA and RNA). When UV radiation penetrates the cell wall of an organisms it destroys the cell's ability to reproduce. UV radiation, generated by an electrical discharge through mercury vapor, penetrates the genetic material of microorganisms and retards their ability to reproduce. The effectiveness of a UV disinfection system depends on the characteristics of the waste fluid, the amount of time the organisms are exposed to the UV radiation, and the reactor configuration.

The optimum wavelength to inactivate organisms is in the range of 250 to 270 nm. Low pressure lamps emit essentially monochromatic light at the wavelength of 253.7 nm. Standard lengths of low pressure lamps are 0.75 m to 1.5 m with diameters of 1.5 cm to 2.0 cm. Generally, two types of UV reactor configurations exist: contact types and noncontact types. In both configurations, the fluid to be treated can flow parallel or perpendicular to the lamps. In the contact reactor, a series of mercury lamps are enclosed in quartz sleeves over which the fluid to be disinfected is routed. As the fluid passes over the lamps, UV radiation penetrates the cells of organisms suspended in the fluid and effectively "kills" the organism. In a noncontact reactor configuration, UV lamps are suspended outside a transparent fluid conduit, which carries the fluid to be disinfected. In both types of reactors, a ballast or control box provides a starting voltage for the lamps and maintains a continuous current.

The advantages of UV disinfection include: (1) effective inactivation of most spores, viruses, and cysts, (2) UV disinfection leaves no residual effect that can be harmful to humans or aquatic life, and (3) UV disinfection has a shorter contact time when compared with other forms of disinfection (approximately 20 to 30 seconds with low-pressure lamps).

FIG. 7 is a schematic diagram of a series of four filter separator annuli 701, 702, 703, 704 each having a flux cartridge 710 in accordance with one embodiment of the present invention and illustrating the principle shown in FIG. 7. As in FIG. 2A, the annuli in FIG. 5 are for illustrative convenience and represent one or more annuli in a filter pod. Similarly, although a single series of separator annuli is illustrated in FIG. 7, several such parallel operations may work together to increase production volume as shown by the portion of FIG. 7 titled "optional parallel operation."

With reference to FIG. 7, untreated or production fluid 760 is routed by a pump (P) 750 to a first filter annulus 701 with a flux cartridge 710 having an effective porosity of 100 microns. A fluid ring 720 exists between the inside surface of each annuli 701, 702, 703, 704 and the outer surface of its corresponding flux cartridge 710. The effluent 711A from the first flux cartridge 710 passes into a second filter annulus 702 wherein it is further treated with a second flux cartridge 710 having an effective porosity of 40 microns. A second pump 750 passes the treated effluent from the second annulus 702 into the third annulus 703 wherein the fluid is treated a third time through a flux cartridge 710 having an effective porosity of 10 microns. Finally, the treated effluent from the third annulus 703 is passed into the fourth annulus 704 wherein its flux cartridge has an effective porosity of one micron. The treated fluid is then transported to a storage tank or can be routed to a settling tank for blending operations.

In the embodiment shown, the pumps (P) 750 and ejectors (E) 751, 752 pneumatically operate at different time intervals that can cycle between a filtration cycle (when the pumps P are operating) and an ejection cycle (when the ejectors E are operating) or the ejectors can operate on individual annuli/separators as desired. For example, the filtration cycle can occur for a pre-determined amount of time and at the end of this pre-determined amount of time each separator unit or Q-pod can be backwashed with a reverse flush from the ejector E as explained in regard to FIG. 2A. In alternative embodiments, variables with or without time can be used to determine the length of each cycle interval. One such variable may be an average pressure differential that develops across the flux cartridges 710 of each Q-pod. In one embodiment, the filtration cycle causes an average pressure differential across the flux cartridge membrane of between about 30 and 50 psi (0.2 and 0.35 MPa) and the ejection cycle causes an average pressure differential across the flux cartridge of between about 100 and 300 psi (0.7 and 2.0 MPa). Vigorous backwash forces refresh each flux cartridge and help maintain the turbulent fluid dynamics occurring within the fluid ring of each filter unit. The filtration cycles and ejection cycles can be optimized based upon the amounts and types of contaminants in the untreated fluid.

In a further embodiment, the filter membrane or flux cartridge can comprise a catalyst (e.g. cobalt-molybdenum, alumina, aluminosilicate zeolite, palladium, platinum, nickel, and rhodium) to enhance chemical reactions within the separator to further the removal of contaminates. Such catalyst should be selected so as to target a particular chemical compound or element, or set of chemical species present in the influent fluid.

In another embodiment, a heated or non-heated gaseous stream can be used to aerate the untreated fluid or any of the streams in the process. Such aeration may occur before any filtration, at any stage of filtration, or between stages of filtration. Such additional gaseous stream further aids in filtration and separation of contaminants from the fluid. Oxygen or other gaseous species chemically reacts with the contaminants further improving the quality of the treated aqueous product. For example, a heated air, oxygen stream, or hydrogen stream can be added at any stage to the aqueous stream being treated. The examples of heated and non-heated gases are provided for purposes of illustration and not limitation.

In one embodiment, the present invention includes a control panel which includes a plurality of control inputs for monitoring and operating the molecular separator apparatus by a user. For example, control inputs can be connected to one or more pieces of equipment, such as pumps, to activate and deactivate the pumps and/or to monitor pressure at various places on the pump. Control inputs can also be used to monitor and/or control the use of the poppet valves pneumatically and/or electrically.

The instant invention results in numerous advantages. First, it provides an efficient method for cleaning or filtering untreated fluid to the point where it may be potable or may be further treated to become potable. Such invention reduces the cost of treating contaminated fluid and/or generating cleaner, usable fluid. Second, the invention provides a way to clean untreated fluid such that the effluent complies with environmental standards. Such cleansed fluid may be safely released to the surface or re-injected back into the ground, and the contaminants may be further concentrated and can then be more appropriately disposed of or used. Third, the invention can help to provide a more stable feed stock to other processes requiring a cleaner low-cost aqueous stream. Fourth, the invention is easily transported by skid and can be placed in almost any location worldwide. Pumping and transportation costs are thereby reduced as contaminants are removed closer to the source of contamination. In one aspect, the separator apparatus is detachably secured to a wheeled transport for placement at or near the source of fluid to be treated. Fifth, it provides for a more economical overall filtration operation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only. While the invention has been particularly shown and described with reference to a preferred embodiment, it will be understood by those skilled in the art that various changes in form and detail may be made therein without departing from the spirit and scope of the invention.

I claim:

1. A method of treating a contaminated fluid comprising:
    pumping an input flow of the untreated fluid having a contaminant into at least one separator having a flux cartridge;
    mechanically inducing cavitation in the untreated fluid adjacent to the flux cartridge by alternating the input flow into the separator between two input flow paths:
    removing a substantial portion of the contaminant from the untreated fluid within the separator via cavitation;
    transporting the treated effluent to an effluent collection tank;
    transporting the remaining waste fluid through a first outlet into a waste fluid collection reservoir; and,
    backwashing the flux cartridge with a portion of the treated effluent from the separator.

2. The method of claim 1 further comprising:
    transporting the waste fluid to a concentrator;
    desiccating the remainder of the waste fluid so that a substantial part of the fluid is removed; and,
    removing a substantial portion of the concentrated contaminant from the concentrator.

3. The method of claim 2 wherein the contaminant removed from the concentrator is substantially dry.

4. The method of claim 3 wherein the substantially dry contaminant is removed from the concentrator by a purge air source.

5. The method of claim 1 further comprising:
    transporting the treated effluent to a reverse osmosis unit.

6. The method of claim 1 further comprising:
    disinfecting the treated effluent with an ultraviolet disinfection unit.

7. The method of claim 1 wherein a plurality of separators are operated in a parallel configuration.

8. The method of claim 1 wherein a first plurality of separators are operated in a parallel configuration and a second plurality of separators are operated in a series configuration, further wherein the first plurality of separators and second plurality of separators are in fluid communication with each other.

9. The method of claim 1 wherein the flow of untreated fluid into the separator is controlled by at least one poppet valve.

10. The method of claim 1 wherein the removal of a substantial portion of the contaminant from the untreated fluid is accomplished by subjecting the untreated fluid to an ultrasonic wave source.

11. The method of claim 1 wherein the removal of a substantial portion of the contaminant from the untreated fluid is accomplished by subjecting the untreated fluid to a magnetic field.

12. The method of claim 1 wherein the removal of a substantial portion of the contaminant from the untreated fluid is accomplished by subjecting the untreated fluid to heat.

13. The method of claim 1 wherein the removal of a substantial portion of the contaminant from the untreated fluid is accomplished by subjecting the untreated to an electrical current.

* * * * *